United States Patent [19]

Chen et al.

[11] Patent Number: 4,708,815
[45] Date of Patent: Nov. 24, 1987

[54] WATER TREATMENT POLYMERS AND METHODS OF USE THEREOF

[75] Inventors: Fu Chen, Newtown; Keith A. Bair, Hatboro, both of Pa.

[73] Assignee: Betz Laboratories, Inc., Trevose, Pa.

[21] Appl. No.: 12,961

[22] Filed: Feb. 10, 1987

Related U.S. Application Data

[60] Division of Ser. No. 816,173, Jan. 3, 1986, Pat. No. 4,659,480, which is a continuation-in-part of Ser. No. 545,563, Oct. 26, 1983, abandoned.

[51] Int. Cl.$^4$ ................................................ C02F 5/14
[52] U.S. Cl. .................................... 252/181; 252/175; 252/180; 524/547; 526/277
[58] Field of Search ...................... 252/175, 180, 181; 524/547; 526/277

[56] References Cited

U.S. PATENT DOCUMENTS

| | | | |
|---|---|---|---|
| 2,634,296 | 4/1953 | Morris et al. | 568/648 |
| 2,723,971 | 11/1955 | Cupery | 525/60 |
| 2,847,477 | 8/1958 | Watanabe et al. | 568/626 |
| 2,847,478 | 8/1958 | Hwa et al. | 568/626 |
| 3,228,979 | 1/1966 | Gaertner | 260/512 R |
| 3,706,717 | 12/1972 | Siegele | 210/701 |
| 4,029,577 | 6/1977 | Godlewski et al. | 210/701 |
| 4,046,707 | 9/1977 | Smith et al. | 210/699 |
| 4,095,029 | 6/1978 | Fields | 252/395 |
| 4,207,405 | 6/1980 | Masler et al. | 210/699 |
| 4,209,398 | 6/1980 | Ii et al. | 252/389.2 |
| 4,303,568 | 12/1981 | May et al. | 252/389.2 |
| 4,469,615 | 9/1984 | Isuruoka et al. | 252/181 |
| 4,500,693 | 2/1985 | Takehara et al. | 526/240 |

FOREIGN PATENT DOCUMENTS

| | | | |
|---|---|---|---|
| 56-155692 | 12/1981 | Japan | 210/698 |
| 58-7415 | 1/1983 | Japan . | |
| 58-9987 | 1/1983 | Japan . | |
| 1491701 | 11/1977 | United Kingdom . | |

OTHER PUBLICATIONS

Chemical Abstract 85:20537p, "Reaction of Unsaturated Alcohols and their Derivatives with Sultones," 1976.

Cops I, "Copolymerizable Surfactant," Alcolac, Technical Literature, Baltimore, Md.

*Primary Examiner*—Robert Wax
*Attorney, Agent, or Firm*—Alexander D. Ricci; Bruce E. Peacock

[57] ABSTRACT

Scale control polymers and methods of use are disclosed. The polymers are water soluble and are composed of repeat units formed from an $\alpha,\beta$ ethylenically unsaturated compound, and repeat units formed from allyl alkylene phosphite ethers.

7 Claims, No Drawings

WATER TREATMENT POLYMERS AND METHODS OF USE THEREOF

CROSS REFERENCE RELATED APPLICATIONS

This is a division of application Ser. No. 816,173, filed Jan. 3, 1986, now U.S. Pat. No. 4,659,480, which is a continuation-in-part of application Ser. No. 545,563, filed Oct. 26, 1983, now abandoned.

FIELD OF THE INVENTION

The present invention pertains to a composition and method of utilizing same to control the formation and deposition of scale imparting compounds in water systems such as cooling, boiler and gas scrubbing systems.

BACKGROUND OF THE INVENTION

The problem of scale formation and attendant effects have troubled water systems for years. For instance, scale tends to accumulate on internal walls of various water systems, such as boiler and cooling systems, and thereby materially lessens the operational efficiency of the system.

Deposits in lines, heat exchange equipment, etc., may originate from several causes. For example, precipitation of calcium carbonate, calcium sulfate and calcium phosphate in the water system leads to an accumulation of these scale imparting compounds along or around the metal surfaces which contact the flowing water circulating through the system. In this manner, heat transfer functions of the particular system are severely impeded.

Typically, in cooling water systems, the formation of calcium sulfate, calcium phosphate and calcium carbonate, among others, has proven deleterious to the overall efficiency of the cooling water system. Recently, due to the popularity of cooling treatments using high levels of orthophosphate to promote passivation of the metal surfaces in contact with the system water, it has become critically important to control calcium phosphate crystallization so that relatively high levels of orthophosphate may be maintained in the system to achieve the desired passivation without resulting in fouling or impeded heat transfer functions which would normally be caused by calcium phosphate deposition.

Although steam generating systems are somewhat different from cooling water systems, they share a common problem in regard to deposit formation.

As detailed in the Betz Handbook of Industrial Water Conditioning, 8th Edition, 1980, Betz Laboratories, Inc., Trevose, PA Pages 85–96, the formation of scale and sludge deposits on boiler heating surfaces is a serious problem encountered in steam generation. Although current industrial steam producing systems make use of sophisticated external treatments of the boiler feedwater, e.g., coagulation, filtration,, softening of water prior to its feed into the boiler system, these operations are only moderately effective. In all cases, external treatment does not in itself provide adequate treatment since muds, sludge, silts and hardness-imparting ions escape the treatment, and eventually are introduced into the steam generating system.

In addition to the problems caused by mud, sludge or silts, the industry has also had to contend with boiler scale. Although external treatment is utilized specifically in an attempt to remove calcium and magnesium from the feedwater, scale formation due to residual hardness, i.e., calcium and magnesium salts, is always experienced. Accordingly, internal treatment, i.e., treatment of the water fed to the system, is necessary to prevent, reduce and/or retard formation of the scale imparting compounds and their resultant deposition. The carbonates of magnesium and calcium are not the only problem compounds as regards scale, but also waters having high contents of phosphate, sulfate and silicate ions either occurring naturally or added for other purposes cause problems since calcium and magnesium, and any iron or copper present, react with each and deposit as boiler scale. As is obvious, deposition on the structural parts of a steam generating system causes poorer circulation and lower heat transfer capacity, resulting in an overall loss in efficiency.

SUMMARY OF THE INVENTION

We have found that certain allyl alkylene phosphite either copolymers and terpolymers function to control the formation of mineral deposits in water systems. Specifically, the novel copolymers of the invention comprise repeat units having the structure

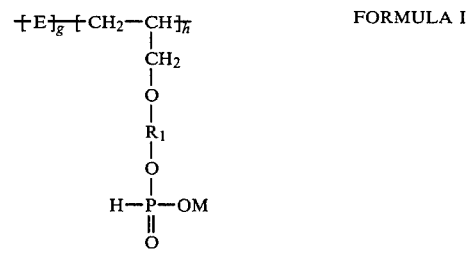

FORMULA I wherein E in the above formula is the residue remaining after polymerization of an $\alpha, \beta$ ethylenically unsaturated compound, preferably carboxylic acid, amide form thereof, or lower alkyl ($C_1$–$C_6$) ester or hydroxylated lower alkyl ($C_1$–$C_6$) ester of such carboxylic acid. Compounds encompassed by E include the residue remaining after polymerization of acrylic acid, methacrylic acid, acrylamide, maleic acid or anhydride, styrene, and itaconic acid; and the like. Water soluble salt forms of the carboxylic acids are also within the purview of the invention.

One or more differently structured monomers may be used as the E constituent provided that they fall within the definition of E above given. One such preferred mixture of E monomers would be acrylic acid/2-hydroxypropyl acrylate.

$R_1$ in the above formula (Formula I) is a hydroxy substituted lower alkylene group having from about 1 to 6 carbon atoms or a non-substituted lower alkylene group having from 1 to 6 carbon atoms. M in Formula I is a water soluble cation (e.g., $NH_4^+$, alkali metal) or hydrogen.

PRIOR ART

U.S. Pat. No. 4,500,693 (Takehara, et. al.) discloses sundry copolymers composed of a (meth) acrylic acid monomer and an allylic ether monomer. Such polymers are disclosed as being useful dispersants and scale preventing agents that may be used in cooling water or water collection systems, etc. One of the Japanese priority applications corresponding to the U.S. Pat. No. 4,500,693 indicates that the invention is directed toward a low or non-phosphorus scale control treatment approach.

In accordance with the U.S. Pat. No. 4,500,693 disclosure, the allylic ether monomer may include, inter alia, the reaction product of allyloxy dihydroxypropane with various reagents, such as, ethylene oxide, phosphorus pentoxide, propylene oxide, monoaryl sorbitan, etc. When phosphorus pentoxide is reacted with allyloxydihydroxypropane, the resulting product is reported to contain phosphate functionality—in contrast to the phosphite functionality bonded to the polymer matrix in accordance with the present invention.

Further, in a comparative test, a polymer of the present invention, namely an acrylic acid/glyceryl allyl ether/allyloxyhydroxypropyl phosphite terpolymer exhibited surprising and unexpectedly superior results, in comparison to a phosphate containing polymer prepared in accordance with Example 2 of the U.S. Pat. No. 4,500,693 patent disclosure.

As stated above, control of calcium phosphate has become critical to those water systems that maintain relatively high orthophosphate levels so as to aid in the formation of highly desirable passive oxide film along water system metallurgy. For example, Godlewski, et. al., U.S. Pat. No. 4,029,577 teaches that certain acrylic acid type/hydroxyalkyl (meth) acrylates are effective calcium phosphate scale control agents. In U.S. Pat. No. 4,303,568 (May, et. al.) methods of utilizing such polymers to form passivated films are taught.

Of further interest to the present invention is U.S. Pat. No. 4,207,405 (Masler, et. al.) wherein water treatment usage of certain phosphorous acid/carboxylic polymer reaction products is taught. Specific teachings of this reference include reaction of poly (meth) acrylic acid with phosphorous acid or precursor thereof to yield a hydroxydiphosphonic acid adduct with the polymer. The disclosed reaction must be carried out under anhydrous conditions, with the product then being hydrolyzed in an aqueous medium. The precise structure of the reaction product is difficult to identify and contains only low levels of phosphorus substitution.

Of lesser interest are U.S. Pat. Nos. 3,262,903 (Robertson) and 2,723,971 (Cupery) which teach reaction of a polyepoxide with orthophosphoric acid to provide a polymer having a phosphoric acid ester substituent. The resulting polymeric phosphate is soluble in organic solvents and is useful as a film forming ingredient in coating compositions. It cannot be used in the water treatment field wherein water solubility is an essential criterion.

Other prior art patents and publications which may be of interest include: Japanese Pat. No. 56-155692, U.S. Pat. No. 4,209,398 (Ii, et. al.) and U.S. Pat. No. 4,469,615 (Tsuruoka, et al.).

DETAILED DESCRIPTION OF THE INVENTION

In accordance with the invention, it has been discovered that water soluble copolymers and terpolymers, as shown in Formula I hereinafter, are effective in controlling the formation of mineral deposits and in inhibiting corrosion in various water systems. These polymers comprise monomeric repeat units composed of an ethylenically unsaturated compound or compounds and allyl alkylene phosphite ether compounds, wherein the alkylene group comprises from about 1-6 carbon atoms.

The water soluble copolymers and terpolymers of the invention comprise repeat units having the structure:

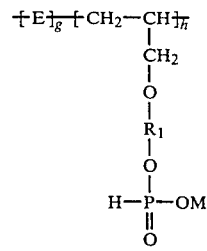

FORMULA I wherein E in the above formula is the residue remaining after polymerization of an α, β ethylenically unsaturated compound, preferably carboxylic acid, amide form thereof, or lower alkyl ($C_1$–$C_6$) ester or hydroxylated lower alkyl ($C_1$–$C_6$) ester of such carboxylic acid. Compounds encompassed by E include the residue remaining after polymerization of acrylic acid, methacrylic acid, acrylamide, maleic acid or anhydride, styrene and itaconic acid; and the like. Water soluble salt forms of the carboxylic acids are also within the purview of the invention.

One or more differently structured monomers may be used as the E constituent provided that they fall within the definition of E above given. One such preferred mixture of E monomers would be acrylic acid/2-hydroxypropyl acrylate.

$R_1$ in the above formula (Formula I) is a hydroxy substituted lower alkylene group having from about 1 to 6 carbon atoms or a non-substituted lower alkylene group having from 1 to 6 carbon atoms. M in Formula I is a water soluble cation (e.g., $NH_4^+$, alkali metal) or hydrogen.

The molar ratio of the monomers (g:h) of Formula I may fall within the range of 30:1 to 1:20, with a molar ratio (g:h) of about 10:1 to 1:5 being preferred.

The number average molecular weight of the water soluble copolymers of Formula I may fall within the range of 1,000 to 1,000,000. Preferably, the number average molecular weight will be within the range of about 1,500 to about 500,000, with the range of about 1,500 to about 10,000 being even more highly desirable. The key criterion is that the polymer be water soluble.

As to preparation of the monomer designated as g hereinabove, these may be in accordance with well known techniques. For instance, one such possible monomer, acrylic acid, may be prepared by hydrolysis of acrylonitrile or by oxidation of acrolein.

As to the allyl ether monomer (monomer h), this may be prepared in accordance with the disclosure of U.S. Pat. No. 2,847,477 followed by reaction with $H_3PO_3$ (which is hereby incorporated herein by reference) or it may, more preferably, be prepared by a ring opening reaction using an allyl glycidyl ether (AGE) precursor to prepare the preferred 1-allyloxy hydroxypropyl phosphite monomer. To prepare the other acceptable 1-allyloxy hydroxyalkyl ($C_1$–$C_6$) phosphite monomers, the skilled artisan will simply utilize the corresponding epoxide.

The AGE is reacted with phosphorous acid ($H_3PO_3$) or precursor, such as $PCl_3$, to form a mixed monomer solution in accordance with the equation:

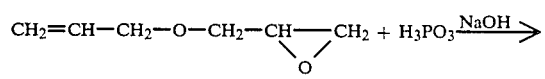

-continued

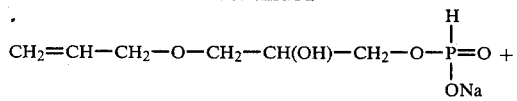

(AHPP) allyloxy hydroxy propane phosphite primary isomer (major)

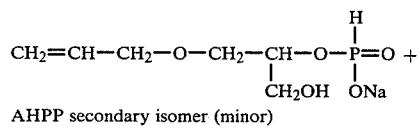

AHPP secondary isomer (minor)

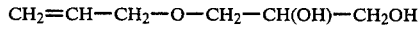

1-allyloxy-2,3-dihydroxypropane (hydrolysate—hydrolysis product of AGE—glyceryl allyl ether—GAE—)

The reaction may be carried out in an aqueous medium with a reaction temperature ranging from 25° to 99° C. For each mole of phosphorous acid used, 1.0 to 2.0 moles of sodium hydroxide may be used, with 1.0 to 1.5 moles being preferred. Allyl glycidyl ether may be added over a period of from half an hour to four hours with the longer time being preferred.

The structures of the preferred allyloxy hydroxypropyl phosphites (AHPP) were substantiated by $^{13}C$ and $^{31}P$ NMR spectroscopy and IR spectra. The $^{31}P$ NMR spectra showed two major resonances at 8.7 ppm and 7.3 ppm downfield from external phosphoric acid. These were assigned to the primary and secondary monosodium allyloxy hydroxy propyl phosphites (AHPP), respectively. The one-bond P—H coupling constant is approximately 620 Hz. A trace of inorganic phosphite was noted at 4.3 ppm. The $^{13}C$ NMR showed the AHPP at 64.5, 68.9, 70.3, 71.8, 118.1 and 133.8 ppm downfield from external dioxane. The IR spectra showed an intense P—H stretch at 2380 cm$^{-1}$ and P=O stretch at 12.10 cm$^{-1}$. The glyceryl allyl ether (GAE) was detected by $^{13}C$ NMR at 63.2, 70.4, 70.8 and 71.6 ppm.

It is noted that the Na ion present in the AHPP monomer above may be replaced with hydrogen, K, NH$_4^+$, or any water soluble cation. The Na ion may also be replaced by an organic amine group or lower alkyl group of from about 1-3 carbon atoms. The molar ratio of the AGE:AHPP components in the mixed monomer solution may be varied to result in different ratios of these two components in the resulting polymer.

In U.S. application Ser. No. 545,563, it was originally thought that reaction of AGE with H$_3$PO$_3$ would yield a phosphonate reaction product. However, NMR analysis has now revealed that a phosphite functionality is actually formed.

If desired, the 1-allyloxy-2,3-dihydroxypropane (GAE hydrolysate of AGE) may be removed from the mixed monomer solution (i.e., leaving an aqueous solution of the two AHPP monomers) via distillation, solvent extraction, etc. At present, it is preferred to utilize the mixed monomer solution as it is produced (which therefore includes 1-allyloxy-2,3-dihydroxypropane GAE). In such cases, after polymerization, the resulting polymer comprises 1-allyloxy-2,3-dihydroxy propane (GAE) which incorporates into the polymeric matrix along with the AHPP isomers. When the GAE component of the mixed monomer solution is not removed, the resulting terpolymer may comprise:

| | mole % |
|---|---|
| α,β-ethylenically unsaturated monomer | 40-90 |
| GAE | 1-35 |
| AHPP | 2-40 | with the foregoing adding up to 100 mole%.

After the desired monomers are produced and isolated, radical polymerization may proceed in solution, suspension, bulk, emulsion or thermal polymerization form. For instance, in suspension polymerization, the reaction may be initiated by an azo compound or an organic peroxide, with the monomers suspended in hexane or other organic reagents. On the other hand, in solution polymerization, the reaction may be initiated via conventional persulfate or peroxide initiators. Commonly used chain transfer agents such as lower alkyl alcohols, amines or mercapto compounds may be used to regulate the molecular weight. An accelerator such as sodium bisulfite or ascorbic acid may also be used.

The fact that polymers were formed by the above method was substantiated by viscosity increase, gel permeation chromatography, IR, $^{13}C$ and $^{31}P$ NMR spectroscopy. The $^{13}C$ NMR spectra showed a broad, polymer type backbone with complex C—O region (62-74 ppm) and no evidence of unreacted monomers. The $^{-}P$ NMR spectra were similar to that of allyloxy hydroxypropyl phosphite but with broader absorption, an indication of polymer formation.

Since, in accordance with the preferred method for obtaining the phosphite monomer, minor amounts of 1-allyloxy-2,3-dihydroxypropane will incorporate into the polymeric matrix when the preferred synthetic route, including use of the mixed monomer solution is used, the resulting polymer comprises repeat units having the structure

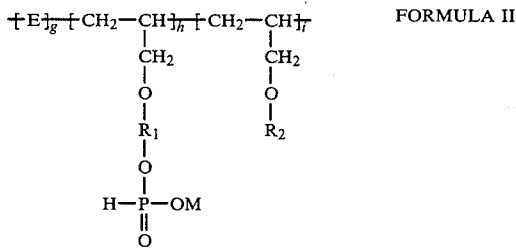

FORMULA II wherein g and h are the same as in Formula I. R$_2$ is a hydroxylated lower alkyl (C$_1$-C$_6$) grouping. Monomer (i) may be present in a molar amount of between about 1-35%, with monomer g being present in a molar amount of between about 40-90%. Monomer h is present in an amount of about 2-40%. All of the foregoing molar percentages should add up to 100%.

The specific preferred polymer is a terpolymer of the sodium salt of acrylic acid/allyl hydroxy propyl phosphite ether/1-allyloxy-2,3-dihydroxypropane (present in only a minor amount) comprising repeat units having the structures:

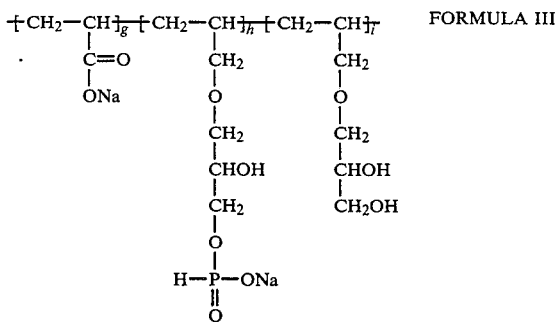

FORMULA III

The polymers should be added to the aqueous system, for which deposit control activity is desired, in an amount effective for the purpose. This amount will vary depending upon the particular system for which treatment is desired and will be influenced by factors such as, the area subject to deposition, pH, temperature, water quantity and the respective concentrations in the water of the potential scale and deposit forming species. For the most part, the polymers will be effective when used at levels of about 0.1–500 parts per million parts of water, and preferably from about 1.0 to 100 parts per million of water contained in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to boiler and cooling water systems, the polymers may also be effectively utilized in scrubber systems and the like wherein the formation and deposition of scale forming salts is a problem. Other possible environments in which the inventive polymers may be used include heat distribution type sea water desalting apparatus and dust collection systems in iron and steel manufacturing industries and as a dispersant in the pulp and paper processing industries. Also the polymers could be used as mineral beneficiation aids such as in iron ore, phosphate, and potash recovery.

EXAMPLES

The invention will now be further described with reference to a number of specific examples which are to be regarded solely as illustrative, and not as restricting the scope of the invention.

EXAMPLE 1

Preparation of 1-propane phosphite, 2-hydroxy-3-(2-propenyloxy)-monosodium salt, (Monosodium Allyloxyhydroxypropyl Phosphite) and GAE mixed monomer solution A suitable reaction flask was equipped with a reflux condenser, an addition funnel, an overhead stirrer, a thermometer and a nitrogen inlet. 160 g of 50% sodium hydroxide (2 mol) and 123 g of deionized water were charged to the flask. 164 g of phosphorous acid (2 mol) were then slowly added to the caustic solution under a nitrogen blanket. The reaction was maintained below 50° C. After this addition, the resulting solution was heated to 95°–99° C. 228 g of allyl glycidyl ether (AGE, 2 mol) were added to the flask in 3 hours. After this addition, the mixture was stirred for an additional 15 minutes at 99° C. and then the volatiles were removed at 4 mmHg and a pot temperature of 120° C. This resulted in a thick, white slurry. The slurry was cooled to room temperature and 250 ml of acetone were added. The mixture was stirred for 1 hour and filtered. The filtrate solution was vacuum distilled to remove the acetone. A thick, slightly yellow solution (235 g) was obtained.

The solution contained the desired phosphite product and glyceryl allyl ether (GAE a hydrolysate of AGE) as verified by $-P$ NMR and IR spectroscopy. The solution was further purified by a continuous water/ethyl acetate extraction. The product was a viscous yellow liquid and weighed 133.2 g. The purity of this material was approximately 90%.

The $-P$ NMR spectrum showed two major resonances at 8.7 ppm and 7.3 ppm downfield from external phosphoric acid. These were assigned to the primary and secondary monosodium allyloxyhydroxypropyl phosphites (AHPP), respectively. The P—H coupling constant was approximately 620 Hz. A trace of inorganic phosphite was noted at 4.3 ppm. The $^{13}C$ NMR showed the AHPP at 64.5, 68.9, 70.3, 71.8, 118.1 and 133.8 ppm downfield from external dioxane. The glyceryl allyl ether was detected at 63.2, 70.4, 70.8 and 71.6 ppm. The IR spectrum showed an intense P—H stretch at 2380 cm$^{-1}$ and P=O stretch at 1210 cm$^{-1}$.

EXAMPLE 2

Mixed Monomer Solution Preparation

Utilizing the apparatus and procedure described in Example 1, 160 g of 50% sodium hydroxide (2 mol), 164 g of phosphorous acid (2 mol) and 120 g of deionized water were charged to the reaction flask. 228 g of AGE (2 mol) were then added over 3 ½ hours at 97° C. This resulted in a clear, dark yellow solution. Water was then removed by vacuum distillation. The reaction mixture was cooled and 300 ml of ethyl acetate were added and stirred for 1 hour. The mixture was then filtered to remove the inorganic material. The filtrate was stripped of ethyl acetate. 310 g of a thick, yellow material were obtained.

The structure of this material was verified by $^{13}C$ NMR and $^{31}P$ NMR. The product contained about 30% (by weight) of the two AHPP isomers, 67% glyceryl allyl ether and 3% monosodium phosphite.

EXAMPLE 3

Mixed Monomer Solution Preparation

Utilizing the apparatus and procedure described in Example 1, 40.0 g of sodium hydroxide (1 mol), 82 g of phosphorous acid (1 mol) and 91.1 g of deionized water was charged to the flask. 114 g of AGE (1 mol) was then added over 2½ hours while the temperature was maintained around 97° C. After stirring for an additional 25 minutes, the reaction mixture was distilled under vacuum to remove 153 g of distillate. The resulting thick slurry was diluted to 40.3% solids by the addition of deionized water. A clear yellow solution was obtained.

The structure of the material obtained was determined by $^{13}C$ NMR and $^{31}P$ NMR. The material contained 35% (by weight) of the two AHPP isomers, 23% glyceryl allyl ether and 42% monosodium phosphite.

EXAMPLE 4

Mixed Monomer Solution Preparation

Utilizing the apparatus and procedure described in Example 1, 50 g of 50% sodium hydroxide (0.625 mol), 70.2 g of potassium hydroxide (1.27 mol), 102.5 g of phosphorous acid (1.25 mol) and 450 g of deionized water were charged to the reaction flask. 128.3 g of AGE (1.125 mol) were then added over 90 minutes at room temperature. The reaction mixture was then heated to 80° C. and maintained for 3½ hours resulting in a clear yellow solution.

The product was identified by $^{13}$C NMR and $^-$P NMR as containing mainly the primary AHPP isomer (70% yield), some unreacted AGE, glyceryl allyl ether and sodium-potassium phosphite.

EXAMPLE 5

Preparation of Acrylic Acid/Glyceryl Allyl Ether/Monosodium Allyloxy Hydroxypropyl Phosphite Terpolymer Molar Ratio of 3/0.2/1

A suitable flask was equipped with a condenser, addition funnel, overhead stirrer, thermometer, nitrogen blanket and an inlet for the initiator. 33.5 g of acrylic acid (0.465 mol) was placed into the additional funnel. 100 g of the mixed monomer solution of Example 1 (33.8%, 0.155 mol), 104 g of deionized water and 13.4 g of isopropanol were charged to the flask. The resulting solution was then heated to reflux under a nitrogen blanket. An initiator solution containing 31% sodium persulfate in deionized water was prepared separately and sparged with nitrogen. The initiator solution (9.9 g) was then added to the reaction flask along with the acrylic acid over a period of 2 hours. One hour after this addition was complete, 0.1 g of 70% t-butylhydrogen peroxide dissolved in 0.9 g of deionized water was added to the reaction mixture. The resulting mixture was heated for one more hour at reflux (89° C.) followed by the removal of 43.1 g of an isopropanol/water azeotrope. The reaction mixture was then cooled to room temperature and 19.0 g of a 50% caustic solution were added.

The copolymer solution, after being diluted with water to 25% solids had a Brookfield viscosity of 11.8 cps. The resulting product was a slightly yellow clear solution. The structure of the terpolymer was verified by $^{13}$C NMR. The spectrum was characterized by a broad, poly (acrylic acid)-type backbone and complex C—O region (62–74 ppm) and contained no evidence of unreacted monomers. The $^{31}$P NMR spectrum was similar to that described in Example 1 except there was a broadening in the width of the peaks which indicates that the AHPP was incorporated into the polymer.

EXAMPLE 6

AA/GAE/AHPP Molar Ratio of 3/1/0.3

Utilizing the apparatus and procedure as described in Example 5, 70 g of the product recovered in Example 2 were dissolved in 236 g of water and added to the flask. 72 g of acrylic acid (1 mol) and 21.3 g of the initiator solution were used to complete the polymerization. The polymer solution, after being diluted to 25% solids, had a Brookfield viscosity of 14.5 cps. The structure of the terpolymer was verified by $^{13}$C NMR.

EXAMPLE 7

AA/GAE/AHPP Molar Ratio of 4/1/2

Utilizing the apparatus and procedure as described in Example 5, 507.7 g of the product recovered in Example 4 were added to the flask. No additional water was necessary and the isopropanol was reduced to 35 g. 72.1 g of acrylic acid (1.0 mol) and 21.3 g of the initiator solution were used to complete the polymerization. The polymer solution, after being diluted to 25% solids, had a Brookfield viscosity of 11.0 cps. The structure of the terpolymer was verified by $^{13}$C NMR. Low levels of unreacted monomer could also be detected.

EXAMPLE 8

AA/GAE/AHPP Molar Ratio of 6.7/1/1

Utilizing the apparatus and procedure as described in Example 5, 113.6 g of the product from Example 3 (40.3% solids) was dissolved in 69.9 g of water and added to the flask. 36 g of acrylic acid (0.5 mol) and 13.3 g of the initiator solution were used to complete the polymerization.

The polymer solution, after being diluted to 25% solids, had a Brookfield viscosity of 13.0 cps. The structure of the terpolymer was verified by $^{13}$C NMR and $^{31}$P NMR. The inorganic monosodium phosphite accounted for 20% of the solids present.

DEPOSIT CONTROL ACTIVITY

One method of evaluating deposit control activity of a material consists of measuring its ability to prevent bulk phase precipitation of a salt at conditions for which the salt would normally precipitate. It is additionally important to recognize that the material being evaluated is tested at "substoichiometric" concentrations. That is, typical molar ratios of precipitating cation to the material being evaluated are on the order of 20:1 and much greater. Consequently, stoichiometric sequestration is not the route through which bulk phase precipitation is prevented. This well known phenomenon is also called "threshold" treatment and is widely practiced in water treatment technology for the prevention of scale (salt) deposits from forming on various surfaces. In the results that follow, calcium phosphate and calcium carbonate salts commonly found in industrial water systems under various conditions have been selected as precipitants. The polymers of the present invention have been evaluated for their ability to prevent precipitation (i.e., inhibit crystallization) of these salts. The results are expressed as "percent inhibition", positive values indicate that the stated percentage of precipitate was prevented from being formed. Except as where noted to the contrary, the following conditions, solutions, and testing procedure were utilized to perform the inhibition tests, the results of which are reported herein in Tables I and II.

CALCIUM CARBONATE INHIBITION

| Conditions | Solutions |
| --- | --- |
| pH = 9.0, 8.5 | 3.25 g CaCl$_2$2H$_2$O/liter DI H$_2$O |
| T = 70° C. | 2.48 g Na$_2$CO$_3$/liter DI H$_2$O |
| 17 hour equilibrium | |
| 1,105 ppm Ca$^{+2}$ as CaCO$_3$ | |
| 702 ppm CO$_3$ | |

Procedure (1) Add 50 ml CaCl$_2$.2H$_2$O pre-adjusted to pH 9.0.
(2) Add treatment.
(3) Add 50 ml Na$_2$CO$_3$ pre-adjusted to pH 9.0.
(4) Heat 5 hours at 70° C. water bath. Remove and cool to room temperature.
(5) Filter 5 mls through 0.2μ filters.
(6) Adjust samples to pH 1.0 with conc. HCl (1 g Conc. HCl).

(7) Allow to stand at least 15 minutes.
(8) Dilute to 50 mls with DI H$_2$O.
(6) Bring pH to 12.0 with NaOH.
(10) Add Ca$^{+2}$ indicator (1 level).
(11) Titrate with EDTA to purple-violet endpoint.
Calculation:

% Inhibition =

$$\frac{\text{ml } EDTA \text{ titrated(treated)} - \text{ml } EDTA \text{ titrated(control)}}{\text{ml } EDTA \text{ titrated(Ca}^{+2}\text{ stock)} - \text{ml } EDTA \text{ titrated(control)}} \times 100$$

CALCIUM PHOSPHATE INHIBITION PROCEDURE

| Conditions | Solutions |
|---|---|
| T = 70° C. | 36.76 CaCl$_2$.2H$_2$O/liter DIH$_2$O |
| pH = 8.5 | 0.4482 g Na$_2$HPO$_4$/liter DIH$_2$O |
| 17 hour equilibration | |
| Ca$^{+2}$ = 250 ppm as CaCO$_3$ | |
| PO$_4$$^{-3}$ = 6 ppm | |

Procedure (1) To about 1800 ml DIH$_2$O in a 2 liter volumetric flask, add 20 ml of CaCl$_2$.2H$_2$O solution followed by 2 drops of conc. HCl.
(2) Add 40 ml of Na$_2$HPO$_4$ solution.
(3) Bring volume to 2 liters with DI water.
(4) Place 100 ml aliquots of solution in 4 oz glass bottles.
(5) Add treatment.
(6) Adjust pH as desired.
(7) Place in 70° C. water bath and equilibrate for 17 hours.
(8) Remove samples and filter while hot through 0.2μ filters.
(9) Cool to room temperature and take Absorbance measurements using Leitz photometer (640 nm).
Preparation for Leitz
a. 5 mls filtrate
b. 10 mls Molybdate Reagent
c. 1 dipper Stannous Reagent
d. Swirl 1 minute, pour into Leitz curvette; wait 1 minute before reading.
(10) Using current calibration curve (Absorbance vs ppm PO$_4$$^{-3}$) find ppm PO$_4$$^{-3}$ of each sample.
Calculation:

% Inhibition =

$$\frac{\text{ppm PO}_4^{-3}\text{(treated)} - \text{ppm PO}_4^{-3}\text{(control)}}{\text{ppm PO}_4^{-3}\text{(stock)} - \text{ppm PO}_4^{-3}\text{(control)}} \times 100$$

TABLE I

Calcium Phosphate Inhibition
Conditions: 600 ppm Ca as CaCO$_3$, 12 ppm PO$_4$$^{-3}$, pH 7.0, 70° C., 17 Hour Equilibration, 2 mM NaHCO$_3$
% Inhibition

| Treatment | Treatment Concentrations (ppm active) | | |
|---|---|---|---|
| | 5 | 10 | 20 |
| Copolymer | | | |
| Example 5 | 13.3 | 13.7 | 91.5 |
| Example 6 | 10.0 | 7.9 | 89.6 |
| Example 7 | 4.4 | 10.7 | 32.9 |

TABLE I-continued

Calcium Phosphate Inhibition
Conditions: 600 ppm Ca as CaCO$_3$, 12 ppm PO$_4$$^{-3}$, pH 7.0, 70° C., 17 Hour Equilibration, 2 mM NaHCO$_3$
% Inhibition

| Treatment | Treatment Concentrations (ppm active) | | |
|---|---|---|---|
| | 5 | 10 | 20 |
| Example 8 | 2.0 | 6.2 | 28.1 |
| Polyacylic Acid mw = 5,000 | 4.7 | 9.7 | 53.8 |

TABLE II

Calcium Carbonate Inhibition
Conditions: 1105 ppm Ca$^{+2}$ as CaCO$_3$, 702 ppm CO$_3$$^{-2}$, pH 9.0, 70° C., 17 Hour Equilibration
% Inhibition

| Treatment | Treatment Concentrations (ppm active) | | |
|---|---|---|---|
| | 5 | 10 | 20 |
| Copolymer | | | |
| Example 5 | 7.4 | 27.5 | 44.2 |
| Example 6 | 2.2 | 19.1 | 37.2 |
| Example 7 | 6.9 | 9.3 | 26.6 |
| Example 8 | 7.8 | 18.0 | 35.9 |
| Polyacrylic Acid mw = 5,000 | 15.3 | 30.5 | 41.5 |

In order to demonstrate the effectiveness of the polymers of the invention in dispersing suspended particulate matter, the following procedures, using Fe$_2$O$_3$ and montmorillonmite clay as suspended solids, were undertaken. Results appear in Tables III and IV. In the results, it is noted that increasing Δ%T values indicate better treatment as more particles remain suspended in the aqueous medium.

Fe$_2$O$_3$ DISPERSION PROCEDURE

| Conditions: | Solutions: |
|---|---|
| T = 25° C. | 0.1% solution Fe$_2$O$_3$ in D.I. H$_2$O |
| pH = 7.5 | 3.68 g CaCl$_2$.2H$_2$O/100 ml DI H$_2$O |

Procedure (1) Prepare a suspension of 0.1% Fe$_2$O$_3$ in DI H$_2$O.
(2) Adjust hardness to 200 ppm Ca$^{+2}$ as CaCO$_3$ using CaCl$_2$.2H$_2$O solution—8 ml/1000 ml of Fe$_2$O$_3$ solution.
(3) Using overhead mixer, mix suspension ½ hour at 1000 rpms.
(4) Remove solution to magnetic stirrer and adjust to pH 7.5 (about 20 minutes to stabilize pH).
(5) Return solution to overhead mixer.
(6) Take 90 ml aliquots of suspension and place 4 oz. glass bottle.
(7) Add treatment and DI water to bring total volume to 100 ml.
(8) Cap bottle, invert several times and place on reciprocating shaker at a moderate speed of about 40 spm for ½ hour.
(9) Place on vibration-proof surface and allow to stand 18 hours.
(10) Without disturbing settled phase, pipet the top 40 mls off the sample. Place in a cell and read %T (at 415 nm).
Calculation
Δ%T = %T (control) − %T (treated)

MONTMORILLONITE DISPERSION PROCEDURE

Similar to that reported hereinabove for $Fe_2O_3$ with the obvious exception that montmorillonite clay was substituted for $Fe_2O_3$.

TABLE III

Montmorillonite Dispersions
Conditions: 200 ppm $Ca^{2+}$ as $CaCO_3$, pH 7.0, 1000 ppm
Montmorillonite, 17 hour equilibration
Δ % Transmittance

| Treatment | Treatment Concentrations (ppm active) | | |
|---|---|---|---|
| | 5 | 10 | 20 |
| Copolymer | | | |
| Example 5 | 10.0 | 28.8 | 35.8 |
| Example 6 | 5.5 | 20.8 | 36.5 |
| Example 7 | 3.5 | 9.0 | 17.3 |
| Example 8 | 14.5 | 26.0 | 33.3 |
| Polyacylic Acid mw = 5,000 | 15.3 | 22.0 | 29.0 |

TABLE IV

Ferric Oxide Dispersions
Conditions: 200 ppm Ca as $CaCO_3$, 300 ppm $Fe_2O_3$, 45° C., pH 7.0
18 Hour Equilibration, 10 mM $NaHCO_3$
Δ % Transmittance

| Treatment | Treatment Concentrations (ppm active) | | |
|---|---|---|---|
| | 5 | 10 | 20 |
| Copolymer | | | |
| Example 5 | 8.3 | 10.5 | 12.5 |
| Example 6 | 6.8 | 9.3 | 11.3 |
| Example 7 | 3.3 | 10.0 | 12.8 |
| Example 8 | 7.0 | 9.3 | 12.0 |
| Polyacrylic Acid mw = 5,000 | 4.3 | 8.5 | 16.5 |

Discussion

The examples demonstrate that the polymers of the present invention are effective in inhibiting the formation of calcium phosphate and calcium carbonate, both of which are commonly encountered in industrial water systems, such as cooling water systems. Further, the polymers effectively disperse iron oxide and clay which are sometimes encountered as troublesome fouling species.

Passivation

Although preliminary data suggests that the polymers of the invention, when used singly, may not adequately inhibit corrosion, the demonstrated efficacy of the polymers in inhibiting calcium phosphate precipitation is very important. For instance, one successfully established cooling water treatment method provides a passivated oxide film on metal surfaces in contact with the aqueous medium via addition of orthophosphate, organo-phosphonate and an acrylic acid/hydroxylated alkyl acrylate copolymer. Details of such method are disclosed in U.S. Pat. No. 4,303,568 (May et al.). The entire content of this patent is hereby incorporated by reference. Based upon the deposit control efficacy shown by the instant copolymers, as well as the minimum corrosion rates displayed herein in the recirculator studies, it is thought that the subject copolymers can be substituted for the polymers disclosed in the aforementioned May et al patent so as to provide the important passivated oxide film on the desired metal surfaces.

As is stated in that patent, the passive oxide film is provided on metal surfaces in contact with the aqueous medium without substantial attendant deposition formed thereon. A composition containing polymer and orthophosphate and optionally but preferably a phosphonate, polyphosphate and copper corrosion inhibitors is used in order to achieve such passivation. A typical composition contains on a weight ratio basis of polymer to orthophosphate expressed as $PO_4^{---}$ of about 1:8 to 4:1 and preferably about 1:6 to 2:1. When a polyphosphate* is included, the weight ratio of orthophosphate to polyphosphate on a $PO_4^{---}$ basis is 15:1 to 1:3, and preferably 2.3:1 to 1:1. Similarly, if the organo-phosphonate is included, the ratio of the orthophosphate to the phosphonate expressed as $PO_4^{---}$ to $PO_4^{---}$ is 1:2 to 13:1, and preferably 2:1 to 8:1. Any copper corrosion inhibitor may be included in the composition (0.01 to 5% by weight) in an amount which will be effective for controlling the copper corrosion in a given system: 0.05 to 10 parts per million and preferably 0.5 to 5 parts per million. Similarly, zinc salts may be included if additional protection is needed.

*Betz Handbook of Industrial Water Conditioning, 6th edition, 1962, pages 394–396, Betz Laboratories, Inc., Trevose, PA.

In treating the aqueous systems to provide such passivation, the following dosages in parts per million parts of water in said aqueous systems of the respective ingredients are desirable, with the dosages, of course, being based upon the severity of the corrosion problem foreseen or experienced:

orthophosphate (expressed as $PO_4^{---}$): 2 to 50 parts per million parts of water (ppm) and preferably 6 to 30 ppm;

polymer: 0.3 to 120 ppm and preferably 3 to 25 ppm;

polyphosphate (expressed as $PO_4^{---}$): 0.1 to 30, and preferably 3 to 10, parts per million parts of water;

phosphonate (expressed as $PO_4^{---}$): 0.04 to 20, and preferably 1 to 6, parts per million parts of water.

The preferred rate of application of this treatment to cooling water systems and the ratios of various components depends on the calcium concentration of the cooling water. The treatment is preferably applied in waters having between 15 ppm and 1,000 ppm calcium. Within this range the weight ratio of calcium to orthophosphate is varied from 1:1 to 83.3:1, the weight ratio of polymer to orthophosphate is varied from 1:3 to 1.5:1.

The orthophosphate which is critical to passivation aspect of the present invention is generally obtained by direct addition. However, it is understood that the orthophosphate can also arise due to reversion of either inorganic polyphosphates or the organo-phosphonates, or any other appropriate source or precursor thereof.

The above dosages represent the most desirable ranges since most systems will be treatable therewith. Higher dosages are permissible when the situation demands, but of course are most costly. The effectiveness of the inventive treatments are dependent upon the aqueous medium having a pH of 5.5 and above, and preferably 6.5 to 9.5, and containing calcium ion concentrations, preferably about 15 parts per million parts of water. Below this range, it may be necessary for overall effectiveness to add metallic ions such as zinc, nickel, chromium, etc. as described in column 3, lines 4 to 24 of U.S. Pat. No. 3,837,803.

COMPARATIVE EXAMPLE

The specific product of U.S. Pat. No. 4,500,693 Example 2, was prepared as follows: 70.64 g of allyl glyceryl ether (0.535 mol) were charged to a reaction flask under nitrogen. 38.0 g of phosphorus pentoxide (0.268 mol) were then added over 65 minutes. The reaction mixture was warmed to 65° C. over 20 minutes and maintained at that temperature for 160 minutes. The product was cooled to room temperature followed by the addition of 175 g of deionized water. 70.5 g of this product were then copolymerized with 404.5 g of a 30% potassium methacrylate solution. This was done by adding the monomers simultaneously with 185.1 g of a 3% ammonium persulfate solution to a flask containing 73.9 g of water under nitrogen atmosphere. The addition took 3½ hours and was carried out at 90° C. The yellow brown colored copolymer solution had a Brookfield viscosity of 23.5 cps at 20.8% solids.

This polymer was then tested for calcium phosphate inhibition and was contrasted to the Example 6 polymer of the present invention.

COMPARATIVE TEST

Calcium Phosphate Inhibition
600 ppm Ca as CaCO$_3$, 12 ppm PO$_4$, pH 7, 2 mM NaHCO$_3$,
70° C., 18 hours equilibrium

| Treatment | % Inhibition | | | |
|---|---|---|---|---|
| | 5 ppm Active | 10 ppm Active | 15 ppm Active | 20 ppm Active |
| Acrylic Acid/2-hydroxypropyl Acrylate Mn ≈ 2,000 AA:HPA molar ratio 3:1 | 14.3 | 42.9 | 92.9 | 100.0 |
| Example 6 | 11.0 | 41.8 | 99.8 | 100.0 |
| U.S. Pat. No. 4,500,693 Example 2 | 13.7 | 36.8 | 62.6 | 73.7 |

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. Composition comprising a water soluble polymer, said polymer comprising repeat units characterized by the structure

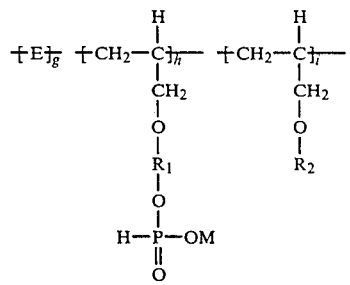

wherein E in the above formula is the repeat unit obtained after polymerization of an $\alpha$, $\beta$ ethylenically unsaturated compound, $R_1$ is a hydroxy substituted lower alkylene group having from about 1-6 carbon atoms or a non-substituted lower alkylene group having from about 1-6 carbon atoms; M is a water soluble cation or hydrogen, wherein $R_2$ comprises a hydroxylated lower alkyl ($C_1$-$C_6$) group and the molar percentage of g in said polymer being between about 40-90 molar %, the molar percentage of h being between about 2-40 molar % and the molar percentage of i in said polymer being between about 1-35 molar %, the total of g, h, and i equalling 100 molar %.

2. Composition as recited in claim 1 wherein E comprises the repeat unit remaining after polymerization of a compound or compounds selected from the group consisting of acrylic acid, acrylamide, maleic acid or anhydride, itaconic acid, methacrylic acid, lower alkyl ($C_1$-$C_6$) ester or hydroxylated lower alkyl ($C_1$-$C_6$) ester of said acids.

3. Composition as recited in claim 2 wherein E comprises acrylic acid repeat unit and 2-hydroxypropylacrylate repeat unit.

4. Composition as recited in claim 1 wherein E comprises acrylic acid repeat unit, $R_1$ comprises 2-hydroxypropylene and $R_2$ comprises 2,3-dihydroxypropyl.

5. Composition as recited in claim 1 further comprising a water soluble orthophosphate compound said composition comprising, on a weight ratio basis from about 1:8 to about 4:1 polymer:orthophosphate.

6. Composition as recited in claim 5 further comprising a water soluble polyphosphate compound, the weight ratio of orthophosphate:polyphosphate being in the range of about 15:1 to 1:3.

7. Composition as recited in claim 1 wherein M comprises a member selected from the group consisting of H, Na, K, NH$_4$$^+$, an organic amine group, or an alkyl group having from 1 to 3 carbon atoms.

* * * * *